US010540498B2

(12) United States Patent
Li et al.

(10) Patent No.: US 10,540,498 B2
(45) Date of Patent: Jan. 21, 2020

(54) TECHNOLOGIES FOR HARDWARE ASSISTED NATIVE MALWARE DETECTION

(71) Applicant: Intel Corporation, Santa Clara, CA (US)

(72) Inventors: Xiaoning Li, Santa Clara, CA (US); Ravi L. Sahita, Beaverton, OR (US); David M. Durham, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 554 days.

(21) Appl. No.: 15/235,806

(22) Filed: Aug. 12, 2016

(65) Prior Publication Data

US 2018/0046803 A1    Feb. 15, 2018

(51) Int. Cl.
*G06F 21/56* (2013.01)
*G06F 11/14* (2006.01)
*G06F 21/52* (2013.01)

(52) U.S. Cl.
CPC ........ *G06F 21/566* (2013.01); *G06F 11/1417* (2013.01); *G06F 2201/84* (2013.01)

(58) Field of Classification Search
CPC .... G06F 21/566; G06F 11/1417; G06F 21/54; G06F 2201/84
See application file for complete search history.

(56) References Cited

U.S. PATENT DOCUMENTS

| 7,284,276 | B2 * | 10/2007 | Conover | G06F 21/55 |
| | | | | 713/165 |
| 7,287,283 | B1 * | 10/2007 | Szor | G06F 21/52 |
| | | | | 713/165 |
| 7,779,472 | B1 * | 8/2010 | Lou | G06F 21/566 |
| | | | | 726/22 |
| 7,979,905 | B2 * | 7/2011 | Kameda | G06F 21/56 |
| | | | | 713/188 |

(Continued)

OTHER PUBLICATIONS

Z. Wang, C. Jia, M. Liu and X. Yu, "Branch Obfuscation Using Code Mobility and Signal," 2012 IEEE 36th Annual Computer Software and Applications Conference Workshops, Izmir, 2012, pp. 553-558. (Year: 2012) (Year: 2012).*

(Continued)

*Primary Examiner* — Jung W Kim
*Assistant Examiner* — Sameera Wickramasuriya
(74) *Attorney, Agent, or Firm* — Barnes & Thornburg LLP

(57) ABSTRACT

Technologies for hardware assisted native malware detection include a computing device. The computing device includes one or more processors with hook logic to monitor for execution of branch instructions of an application, compare the monitored branch instructions to filter criteria, and determine whether a monitored branch instruction satisfies the filter criteria. Additionally, the computing device includes a malware detector to provide the filter criteria to the hook logic, provide an address of a callback function to the hook logic to be executed in response to a determination (Continued)

that a monitored branch instruction satisfies the filter criteria, and analyze, in response to execution of the callback function, the monitored branch instruction to determine whether the monitored branch instruction is indicative of malware. Other embodiments are also described and claimed.

23 Claims, 6 Drawing Sheets

(56) References Cited

U.S. PATENT DOCUMENTS

| | | | | |
|---|---|---|---|---|
| 8,042,179 B2* | 10/2011 | Shoji | | G06F 11/141 |
| | | | | 710/52 |
| 8,220,053 B1* | 7/2012 | Sun | | G06F 21/562 |
| | | | | 726/24 |
| 8,499,354 B1* | 7/2013 | Satish | | G06F 9/44521 |
| | | | | 726/22 |
| 9,203,862 B1* | 12/2015 | Kashyap | | H04L 63/145 |
| 9,443,080 B2* | 9/2016 | Reierson | | G06F 9/541 |
| 9,552,481 B1* | 1/2017 | Guo | | G06F 21/566 |
| 2005/0166001 A1* | 7/2005 | Conover | | G06F 21/55 |
| | | | | 711/100 |
| 2006/0031940 A1* | 2/2006 | Rozman | | G06F 21/53 |
| | | | | 726/27 |
| 2007/0101317 A1* | 5/2007 | Shoji | | G06F 11/141 |
| | | | | 717/131 |
| 2008/0022378 A1* | 1/2008 | Repasi | | G06F 21/51 |
| | | | | 726/5 |
| 2008/0028469 A1* | 1/2008 | Repasi | | G06F 21/554 |
| | | | | 726/24 |
| 2009/0150999 A1* | 6/2009 | Dewey | | G06F 21/56 |
| | | | | 726/24 |
| 2011/0225128 A1* | 9/2011 | Jarrett | | G06F 8/61 |
| | | | | 707/692 |
| 2011/0321165 A1* | 12/2011 | Capalik | | G06F 11/3471 |
| | | | | 726/25 |
| 2014/0013429 A1* | 1/2014 | Lu | | G06F 21/50 |
| | | | | 726/22 |
| 2015/0067763 A1* | 3/2015 | Dalcher | | G06F 21/554 |
| | | | | 726/1 |
| 2015/0242626 A1* | 8/2015 | Wang | | G06F 21/577 |
| | | | | 726/23 |
| 2015/0332045 A1* | 11/2015 | Akiyama | | G06F 21/54 |
| | | | | 726/23 |
| 2016/0055337 A1* | 2/2016 | El-Moussa | | G06F 21/566 |
| | | | | 726/23 |
| 2017/0111388 A1* | 4/2017 | Mehta | | H04L 63/1441 |
| 2018/0046802 A1* | 2/2018 | Pyles | | G06F 21/566 |

OTHER PUBLICATIONS

A. Moser, C. Kruegel and E. Kirda, "Exploring Multiple Execution Paths for Malware Analysis," 2007 IEEE Symposium on Security and Privacy (SP '07), Berkeley, CA, 2007, pp. 231-245. (Year: 2007).*

* cited by examiner

TECHNOLOGIES FOR HARDWARE ASSISTED NATIVE MALWARE DETECTION

BACKGROUND

Virtualization-based malware analysis sandboxes have become one of the mainstream methods to inspect malicious behavior before an unknown object, such as an application, is allowed to continue to be processed on a computing device. The reason is that virtualization presents capabilities such as invisible memory monitoring and disk input/output (IO) virtualization. However, advanced malware that uses evasion techniques can detect that it is within a virtualization-based sandbox system and, in response, hide or modify its intended malicious behavior.

Some systems use native environments to prevent virtualization-aware malware from modifying its behavior and avoiding detection. However, these native approaches suffer from other issues, such as loss of detection capabilities, derived from the fact that the native system does not run a hypervisor. Further, these systems typically have significant complexity and delays attributable to disk image management and system restoration operations. In a native system, monitoring the behavior of an application to detect malware relies on setting hooks in the code of the application. This typically requires recompilation of the code and advanced malware is able to detect the hooks added to the application. In response, the malware may adjust its behavior to avoid detection.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
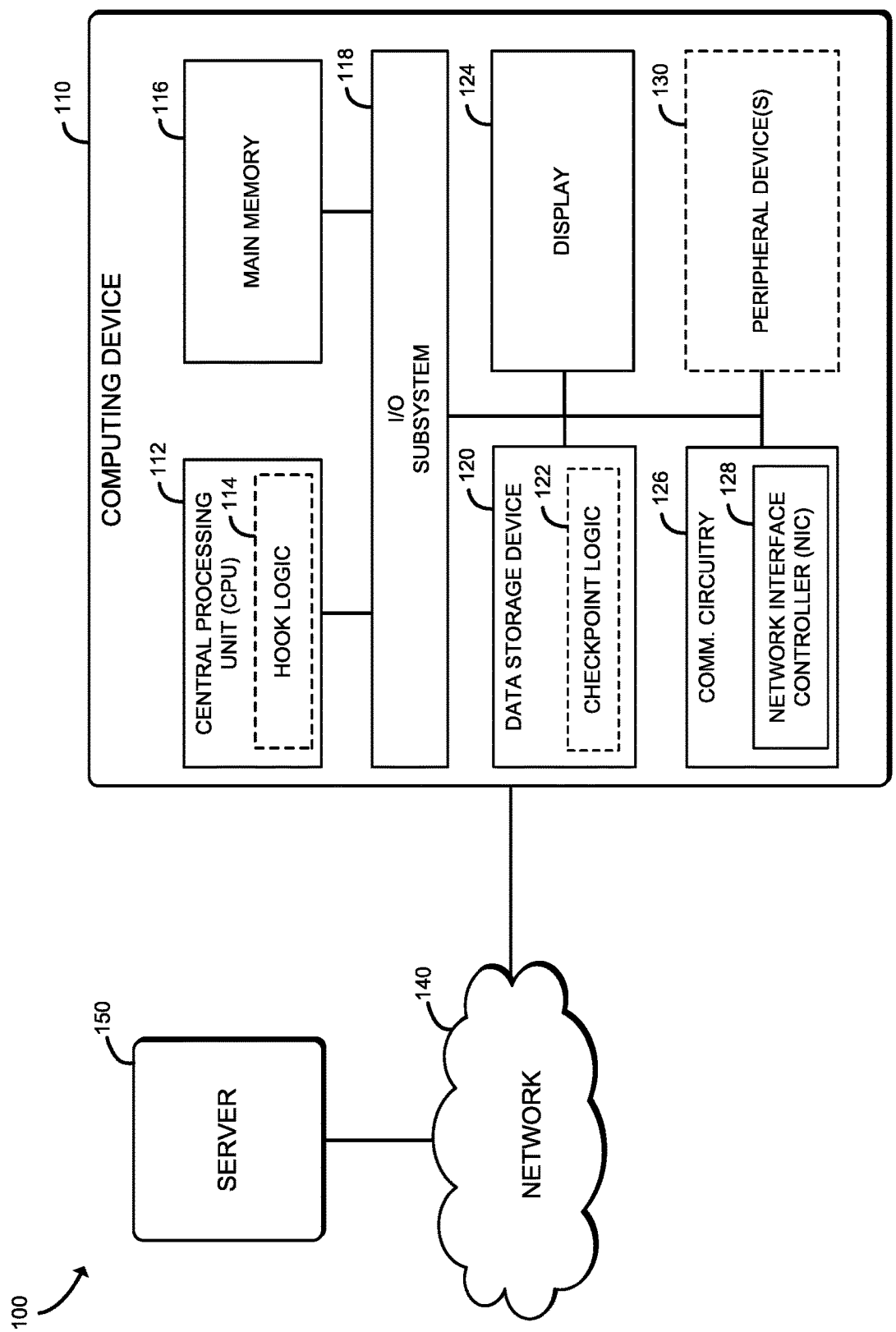
FIG. 1 is a simplified block diagram of at least one embodiment of a system for performing hardware assisted native malware detection, in which a computing device is coupled to a server.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for performing hardware assisted native malware detection includes a computing device 110 in communication with a server 150 through a network 140. The computing device 110 may receive, from the server 150, one or more applications that may contain malware. As such, as explained in more detail herein, the computing device 110 may perform a hardware assisted malware detection process to efficiently detect malware without providing an indication to the malware that the computing device 110 is performing the detection process. In the illustrative embodiment, the computing device 110 does this by using specialized logic in the central processing unit (CPU) to set an "invisible hook" to analyze branch instructions from one or more applications, and to use specialized logic in a data storage device to redirect any data write operations to a section (a "shadow area") of the data storage device that is separate from an area that contains a clean, unmodified system image. In response to detecting malware, the computing device 110 may restart and recover from the unmodified system image, to protect itself from any malicious data that may have been written by the malware.

The computing device 110 may be embodied as any type of computing device capable of performing the functions described herein. For example, in some embodiments, the computing device 110 may be embodied as, without limitation, a computer, a smartphone, a tablet computer, a consumer electronic device, a smart appliance, a laptop computer, a notebook computer, a desktop computer, and/or any other computing device capable of performing functions to perform a hardware assisted detection of malware, as described herein. As shown in FIG. 1, the illustrative computing device 110 includes a central processing unit (CPU) 112, a main memory 116, an input/output subsystem 118, a data storage device 120, a display 124, and communication circuitry 126. Of course, the computing device 110 may include other or additional components, such as those commonly found in a computer (e.g., one or more peripheral devices, etc.). Additionally, in some embodiments, one or more of the illustrative components may be incorporated in, or otherwise from a portion of, another component. For example, the memory 116, or portions thereof, may be incorporated in the CPU 112 in some embodiments.

The CPU 112 may be embodied as any type of processing device capable of performing the functions described herein. For example, the CPU 112 may be embodied as a single or multi-core processor(s) having one or more processor cores, a microcontroller, or other processor or processing/controlling circuit. In the illustrative embodiment, the CPU 112 includes hook logic 114, which may be any hardware components capable of monitoring instructions (i.e., opcodes) to be executed by the CPU 112 on behalf of an application or other process (i.e., potential malware), comparing the monitored instructions to a set of filter criteria to determine whether an instruction matches the filter criteria, and if so, executing a callback function located at a specified address to analyze the instruction in greater detail. In effect, the hook logic 114 provides the ability to set an inline hook into an application or process without actually adding inline hook code to the application or process. As such, the inline hook functionality provided by the hook logic 114 is invisible to the malware will not cause the malware to modify its behavior to avoid detection. Further, given that the hook logic 114 is implemented in specialized hardware that operates alongside the standard components of the CPU 112, the CPU 112 may execute the monitored applications or processes at a normal speed, without incurring a performance penalty.

The main memory 116 may be embodied as any type of volatile or non-volatile memory or data storage capable of performing the functions described herein. In operation, the main memory 116 may store various data and software used during operation of the computing device 110 such as branch filters, malware signatures, operating systems, applications, programs, libraries, and drivers. The main memory 116 is communicatively coupled to the CPU 112 via the I/O subsystem 118. Of course, in other embodiments (e.g., those in which the CPU 112 includes a memory controller), the main memory 116 may be directly communicatively coupled to the CPU 112.

The I/O subsystem 118 may be embodied as circuitry and/or components to facilitate input/output operations with the CPU 112, the main memory 116, and other components of the computing device 110. For example, the I/O subsystem 118 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 118 may form a portion of a system-on-a-chip (SoC) and be incorporated, along with the CPU 112, the memory 116, and other components of the computing device 110, on a single integrated circuit chip.

The data storage device 120 may be embodied as any type of device or devices configured for short-term or long-term storage of data such as, for example, memory devices and circuits, memory cards, solid-state drives, hard disk drives, or other data storage devices. In the illustrative embodiment, the data storage device 120 is a solid-state drive. Further, in the illustrative embodiment, the data storage device 120 includes checkpoint logic 122. The checkpoint logic 122, may be embodied as any hardware and/or firmware components capable of maintaining a system image (a "golden image") that includes the operating system, applications, and other data of the computing device 110 at a particular point in time, such as when the computing device 110 was configured by an original equipment manufacturer (OEM). The checkpoint logic 122 is also capable of performing a recovery operation to return the computing device 110 to its state at that earlier point in time using the system image. Additionally, in the illustrative embodiment, the checkpoint logic 122 is capable of selectively redirecting data write operations to a separate section of storage, referred to as a "shadow area", to avoid modifying the system image. In addition, the checkpoint logic 122 is capable of determining differences between the shadow area and the system image to assist in analyzing how one or more applications or processes may have attempted to modify the operating system files or other aspects of the system image. Given that the illustrative checkpoint logic 122 is embodied in hardware, these functions are offloaded from the CPU 112 and may be performed more efficiently than if they were implemented in software.

The display 124 may be embodied as, or otherwise use, any suitable display technology including, for example, a liquid crystal display (LCD), a light emitting diode (LED) display, a cathode ray tube (CRT) display, a plasma display, and/or other display usable in a compute device. The display may include a touchscreen sensor that uses any suitable touchscreen input technology to detect the user's tactile selection of information displayed on the display including, but not limited to, resistive touchscreen sensors, capacitive touchscreen sensors, surface acoustic wave (SAW) touchscreen sensors, infrared touchscreen sensors, optical imaging touchscreen sensors, acoustic touchscreen sensors, and/or other type of touchscreen sensors. As described herein, the display 124 may be used receive filter criteria for malware, to report the details of a malware detection to a user, and/or to display or receive other information from a user.

The communication circuitry 126 may be embodied as any communication circuit, device, or collection thereof, capable of enabling communications over the network 140, such as between the computing device 110 and the server 150. The communication circuitry 126 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 126 includes a network interface controller (NIC) 128, which may also be referred to as a host fabric interface (HFI). The NIC 128 may be embodied as one or more add-in-boards, daughtercards, network interface cards, controller chips, chipsets, or other devices that may be used by the computing device 110 to connect with other computing devices, such as the server 150. In some embodiments, the NIC 128 may be embodied as part of a system-on-a-chip (SoC) that includes one or more processors, or included on a multichip package that also contains one or more processors. In some embodiments, the NIC 128 may include a local processor (not shown) and/or a local memory (not shown) that are both local to the NIC 128.

Additionally or alternatively, the computing device 110 may include one or more peripheral devices 130. Such peripheral devices 130 may include any type of peripheral device commonly found in a computing device such as speakers, a mouse, a keyboard, and/or other input/output devices, interface devices, and/or other peripheral devices.

Still referring to FIG. 1, the server 150 may be embodied as any type of server computer capable of providing one or more applications to the computing device 110, such as a web server, a file transfer protocol (FTP) server, or other type of server. The server 150 may include components commonly found in a server computer, such as a processor, memory, I/O subsystem, data storage, communication subsystem, etc. Those components may be substantially similar to the corresponding components of the computing device 110, without the hook logic 114 and the checkpoint logic 122. As such, further descriptions of the like components are not repeated herein with the understanding that the description of the corresponding components provided above in regard to the computing device 110 applies equally to the corresponding components of the server 150.

Still referring to FIG. 1, the network 140 may be embodied as any number of various wireless or wired networks. For example, the network 140 may be embodied as, or otherwise include, a publicly-accessible, global network such as the Internet, a cellular network, a wireless or wired wide area network (WAN), or a wireless or wired local area network (LAN). As such, the network 140 may include any number of additional devices, such as additional computers, routers, and switches, to facilitate communications among the devices of the system 100.

Figure 2:
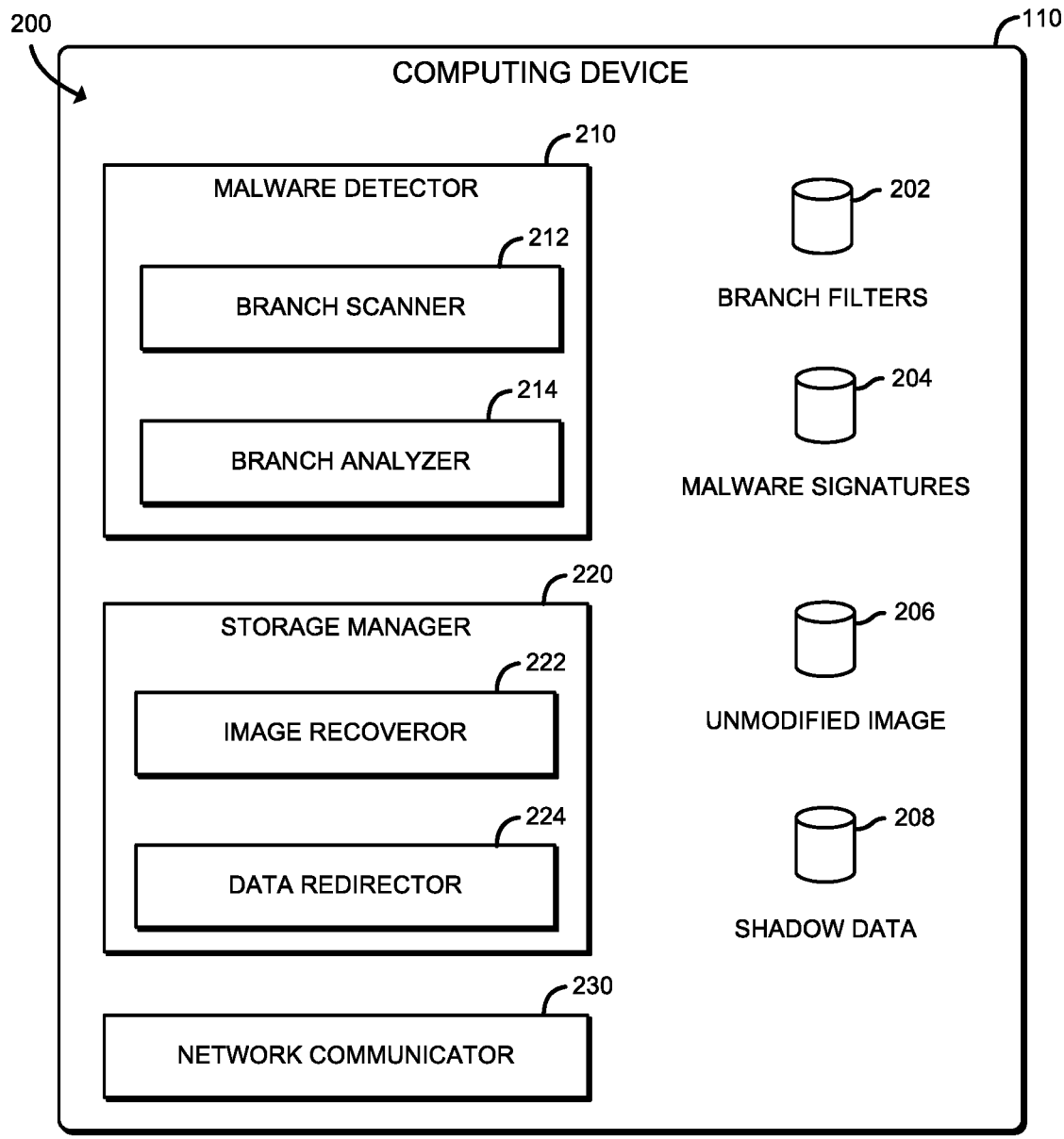
FIG. 2 is a simplified block diagram of at least one embodiment of an environment that may be established by the computing device of FIG. 1.

Referring now to FIG. 2, in the illustrative embodiment, the computing device 110 may establish an environment 200 during operation. The illustrative environment 200 includes a malware detector 210, a storage manager 220, and a network communicator 230. Each of the components of the environment 200 may be embodied as hardware, firmware, software, or a combination thereof. As such, in some embodiments, one or more of the components of the environment 200 may be embodied as circuitry or a collection of electrical devices (e.g., malware detection circuitry 210, storage management circuitry 220, network communication circuitry 230, etc.). It should be appreciated that, in such embodiments, one or more of the malware detection circuitry 210, storage management circuitry 220, and network communication circuitry 230 may form a portion of one or more of the CPU 112, data storage device 120, main memory 116, communication circuitry 126 and/or other components of the computing device 110. Additionally, in some embodiments, one or more of the illustrative components may form a portion of another component and/or one or more of the illustrative components may be independent of one another. Further, in some embodiments, one or more of the components of the environment 200 may be embodied as virtualized hardware components or emulated architecture, which may be established and maintained by the CPU 112 or other components of the computing device 110.

In the illustrative environment 200, the computing device 110 also includes branch filters 202, malware signatures 204, an unmodified image 206, and shadow data 208. In the illustrative embodiment, the branch filters 202 are embodied as or include data representing criteria for filtering monitored branch instructions down to those that may warrant further analysis for malware detection, such as calls to application programming interface (API) functions of the operating system. The malware signatures 204 may be embodied as or include data indicative of known operations or behaviors of malware, including files that malware is known to modify, memory areas that malware is known to write to, and/or other known operations or behaviors of malware. As described in more detail herein, the computing device 110, may analyze a branch instruction satisfying the branch filter 202 to determine whether the branch instruction is indicative of one or more of the malware signatures 204. Further, as described in more detail herein, the computing device 110 may analyze write operations that were redirected to the shadow area to identify additional malware behavior data and add the behavior data to the malware signatures 204. The unmodified image 206 may be embodied as or include an image of the operating system, applications, and other data of the computing device 110 at a particular point in time, such as when the computing device 110 was configured by an original equipment manufacturer (OEM), and is usable to return the computing device 110 to its state at that particular point in time. In the illustrative embodiment, the shadow data 208 is embodied as or includes data from write operations that have been selectively redirected to the shadow area of the data storage device 120. As such, the shadow data 208 may include data that was intended by malware to overwrite system files, such as operating system files, and/or other data written during the operation of computing device 110. The branch filters 202, malware signatures 204, unmodified image 206, and shadow data 208 may be accessed by the various components and/or sub-components of the computing device 110. It should be appreciated that the computing device 110 may include other components, sub-components, modules, sub-modules, and/or devices commonly found in a computing device, which are not illustrated in FIG. 2 for clarity of the description.

The malware detector 210, which may be embodied as hardware, firmware, software, virtualized hardware, emulated architecture, and/or a combination thereof as discussed above, is configured to detect malware by filtering for branches that satisfy the branch filters 202 and to analyze those branches in more detail, such as by comparing them to the malware signatures 204, using a callback function. To do so, in the illustrative embodiment, the malware detector 210 includes a branch scanner 212 and a branch analyzer 214. The branch scanner 212, in the illustrative embodiment, is configured to provide filter criteria (i.e., the branch filters 202) to the hook logic 114 and provide, to the hook logic 114, an address of a callback function to be executed in response to a determination that a monitored branch instruction satisfies the filter criteria. To provide the branch filters 202 and the address of the callback function to the hook logic 114, the branch scanner 212 may execute on or more functions in a library, such as a dynamic link library (DLL), to interface with the hook logic 114. The branch analyzer 214, in the illustrative embodiment, is configured to execute the callback function to analyze a branch instruction of an application that satisfied the one or more branch filters 202. In doing so, the branch analyzer 214 may identify parameters of the branch instruction, which may be located in a stack in the memory 116, and compare the parameters to the malware signatures 204 to determine whether a match exists. The parameters may be indicative of a write operation to write data to particular files or memory regions, such as to embed a virus or other malicious code, to read sensitive data from memory, or to perform other operations that may adversely affect the operation of the computing device 110.

It should be appreciated that each of the branch scanner 212 and the branch analyzer 214 may be separately embodied as hardware, firmware, software, virtualized hardware, emulated architecture, and/or a combination thereof. For example, the branch scanner 212 may be embodied as a hardware component, while the branch analyzer 214 is embodied as a virtualized hardware component or as some other combination of hardware, firmware, software, virtualized hardware, emulated architecture, and/or a combination thereof.

The storage manager 220, which may be embodied as hardware, firmware, software, virtualized hardware, emulated architecture, and/or a combination thereof as discussed above, is configured to maintain an unmodified system image (e.g., the unmodified image 206) and redirect data writes to a shadow area (i.e., the shadow data 208) that is separate from the unmodified image 206. Further, in the illustrative embodiment, the storage manager 220 is configured to facilitate a recovery operation to return the computing device 110 to its earlier state by reading the unmodified image 206 such as during a boot operation. To do so, in the illustrative embodiment, the storage manager 220 includes an image recoveror 222 and a data redirector 224. The image recoveror 222, in the illustrative embodiment, is configured to interface with the checkpoint logic 122 of the data storage device 120 to read the unmodified image 206 and restore the computing device 110 to its earlier state. In the illustrative embodiment, the image recoveror 222 is configured to perform this operation during a boot operation in a Unified Extensible Firmware Interface (UEFI) environment. The data redirector 224, in the illustrative embodiment, is configured to issue a request to the firmware of the data storage device 120, and more specifically, to firmware of the checkpoint logic 122, to enable redirection of data write requests to the shadow area (i.e., the shadow data 208). In the illustrative embodiment, the data redirector 224 enables this redirection during the boot operation, in the UEFI environment. In addition to the above functions, the storage manager 220, in the illustrative embodiment, is configured to compare the shadow area (i.e., the shadow data 208) to the unmodified image 206, such as after malware has been detected, to determine what write operations were performed while the operating system was running. This information may then be applied to the malware signatures 204 to provide further information on the activity of malware.

It should be appreciated that each of the image recoveror 222 and the data redirector 224 may be separately embodied as hardware, firmware, software, virtualized hardware, emulated architecture, and/or a combination thereof. For example, the image recoveror 222 may be embodied as a hardware component, while the data redirector 224 is embodied as a virtualized hardware component or as some other combination of hardware, firmware, software, virtualized hardware, emulated architecture, and/or a combination thereof.

The network communicator 230, which may be embodied as hardware, firmware, software, virtualized hardware, emulated architecture, and/or a combination thereof as discussed above, is configured to manage inbound and outbound data communications to and from the computing device 110, respectively. For example, the network communicator 230 may be configured to transmit a request to the server 150 for an application and receive the application from the server 150 in response to the request. The network communicator 230 may also be configured to transmit or receive other data, such as updated branch filters 202, updated malware signatures 204, and/or malware detection results, with another computing device. In some embodiments, managing inbound and outbound data communications to and from the computing device 110 may be performed by one or more specialized hardware components, such as the network interface controller (NIC) 128.

Figure 3:
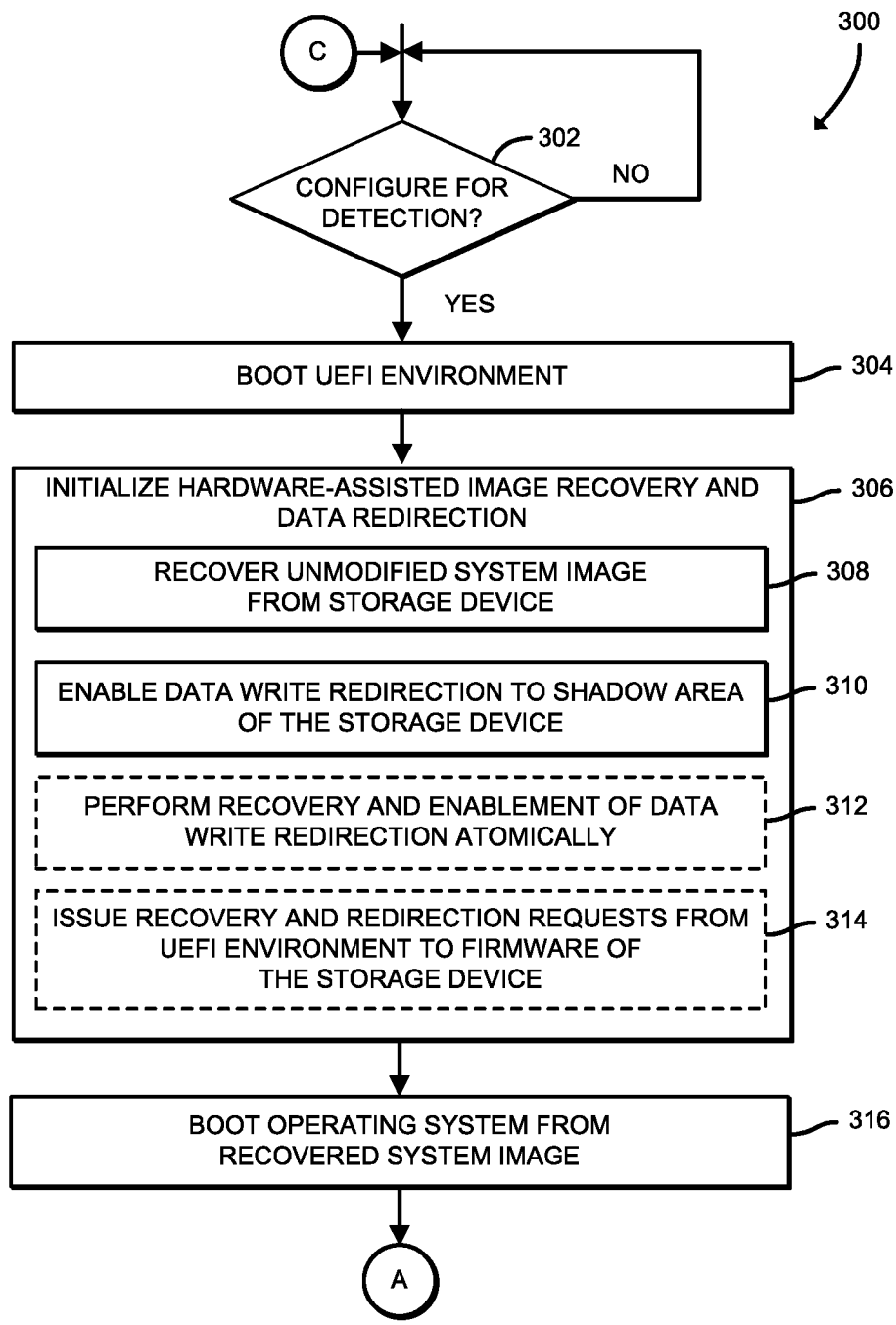
FIGS. 3-4 are a simplified flow diagram of at least one embodiment of a method for configuring the computing device of FIG. 1 to detect malware.

Referring now to FIG. 3, in use, the computing device 110 may execute a method 300 for configuring the computing device 110 to detect malware. The method 300 begins with block 302, in which the computing device 110 determines whether to perform the configuration process. In the illustrative embodiment, the computing device 110 may determine to perform the configuration process in response to an input from a user, such as the press of a corresponding button on the computing device 110 or a selection in a graphical user interface. In other embodiments, the computing device 110 may be configured to perform the configuration process on a predefined schedule. In other embodiments, the computing device 110 may determine whether to perform the configuration process based on other factors. Regardless, if the computing device 110 determines to perform the configuration process, the method 300 advances to block 304. In block 304, the computing device 110 boots the UEFI environment. The UEFI provides a software interface to firmware of the computing device 110, including the firmware of the checkpoint logic 122. Subsequently, in block 306, the computing device 110 initializes a hardware assisted image recovery and data redirection. In doing so, as indicated in block 308, the computing device 110 recovers the unmodified system image (i.e., the unmodified image 206) from the data storage device 120. Further, as indicated in block 310, the computing device 110 enables data write redirection to the shadow area (i.e., the shadow data 208). As indicated in block 312, in the illustrative embodiment, the computing device 110 performs the recovery and the enablement of the data write redirection atomically. Doing so reduces the likelihood that any data writes could be made to the system image (i.e., the unmodified image 206) before the data writes are redirected to the shadow area (i.e., the shadow data 208). As indicated in block 314, in the illustrative embodiment, to initiate the recovery and data redirection, the computing device 110 issues recovery and redirection requests from the UEFI environment to firmware of the data storage device 120, such as to firmware that enables interaction with the checkpoint logic 122. In block 316, the computing device 110 boots the operating system from the recovered system image (i.e., the unmodified image 206).

Figure 4:
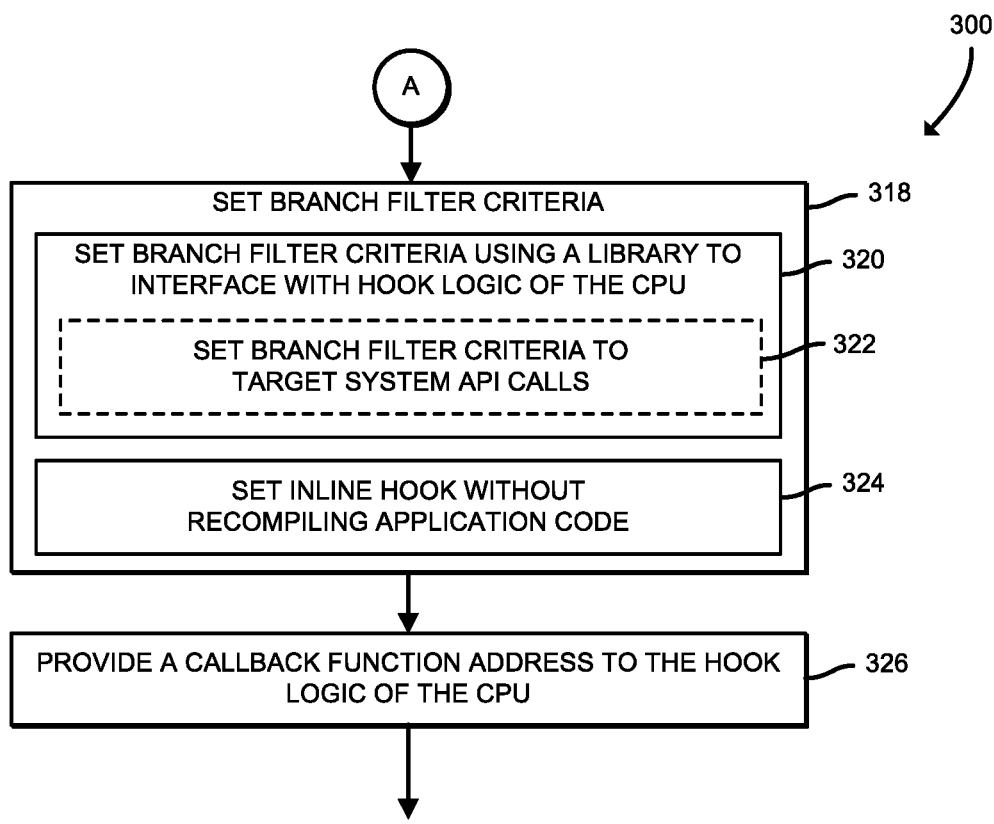

After the operating system has been booted, the method 300 advances to block 318 of FIG. 4. In block 318, the computing device 110 sets branch filter criteria, which defines parameters or other characteristics that, if present in a branch instruction, may be indicative of malware. In doing so, the computing device 110 sets the branch filter criteria using a library (e.g., a DLL) to interface with the hook logic 114 of the CPU. In the illustrative embodiment, the computing device 110 sets the branch filter criteria to target system API calls, as indicated in block 322. As indicated in block 324, the computing device 110 sets an inline hook without recompiling the code of any applications that are to be monitored. In other words, by setting the branch filter criteria, the computing device 110 will inspect all branch instructions that are to be executed and, for the branch instructions that match the criteria, the computing device 110 will execute a callback function to analyze the branch instruction in more detail. In block 326, the computing device 110 provides the address of the callback function to the hook logic 114 of the CPU 112. Once the computing device 110 has performed the configuration method 300, the computing device 110 may proceed with monitoring operations to detect malware, as described with reference to FIGS. 5 and 6.

Figure 5:
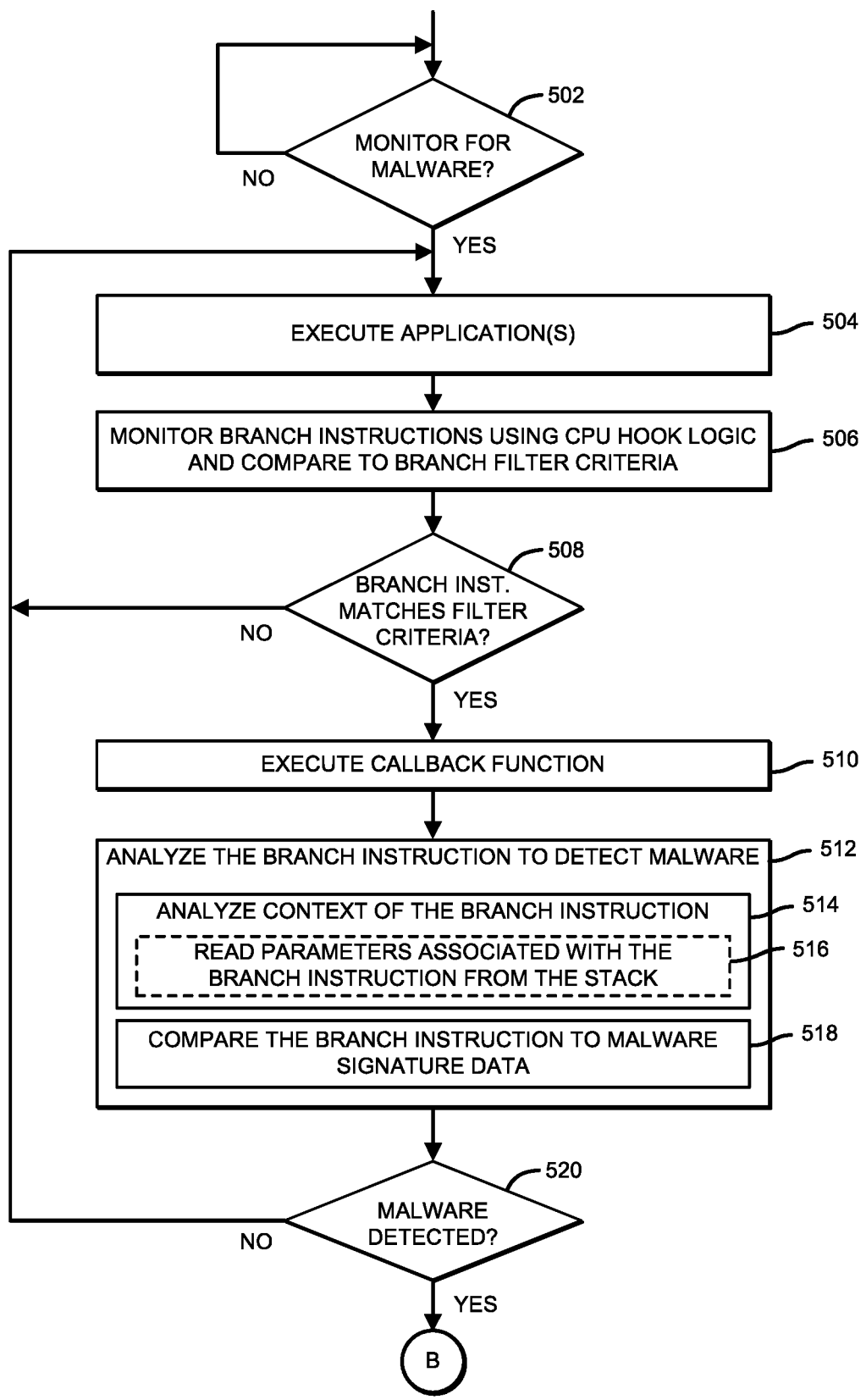
FIGS. 5-6 are a simplified flow diagram of at least one embodiment of a method for monitoring operations to detect malware that may be performed by the computing device of FIG. 1.

Referring now to FIG. 5, in use, the computing device 110 may execute a method 500 for configuring the computing device 110 to detect malware. The method 500 begins with block 502, in which the computing device 110 determines whether to monitor for malware. In the illustrative embodiment, the computing device 110 determines to proceed with monitoring for malware if the computing device 110 has been configured pursuant to the method 300, described above. In some embodiments, the computing device 110 additionally awaits a specific instruction to proceed with monitoring for malware, such as through a graphical user interface or from another source. Regardless, if the computing device 110 determines to monitor for malware, the method 500 advances to block 504. In block 504, the computing device 110 executes one or more applications. The applications may be applications specifically selected by a user or malware detection program for monitoring, or may be any and all applications that may be executed during the normal course of using the computing device 110. As described above, the hook logic 114 provides the ability to efficiently monitor all instructions from all executed applications for specific criteria (i.e., branch filters). Accordingly, in the illustrative embodiment, it is not necessary to limit the monitoring to only those applications already suspected to include malware.

In block 506, the computing device 110 monitors branch instructions using the hook logic 114 of the CPU 112 and compares the branch instructions to the branch filter criteria (i.e., the branch filters 202). In block 508, the computing device 110 determines whether a monitored branch instruction matches the branch filters 202. If not, the method 500 loops back to block 504 in which the computing device 110 continues to execute the applications. Otherwise, the method 500 advances to block 510, in which the computing device 110 executes the callback function at the address provided in block 326 of the method 300. In block 512, while executing the callback function, the computing device 110 analyzes the branch instruction to detect malware. In doing so, the computing device 110 analyzes the context of the branch instruction, as indicated in block 514. In the illustrative embodiment, in analyzing the context of the branch instruction, the computing device 110 reads parameters associated with the branch instruction from the stack. The parameters may specify a file or memory region to write to, the data to be written, and/or other information. Further, in analyzing the branch instruction to detect malware, the computing device 110 compares the branch instruction to malware signature data (i.e., the malware signatures 204). As described above, the malware signatures 204 are indicative of known behavior of malware, including malicious data or instructions that malware is known to write and where the malware writes the data (e.g., to a specific operating system file, etc.). In block 520, the computing device 110 determines whether malware was detected in the analysis of block 512. If not, the method 500 loops back to block 504 in which the computing device 110 continues to execute applications. Otherwise, the method 500 advances to block 522 of FIG. 6, in which the computing device 110 displays the results of the analysis.

Figure 6:
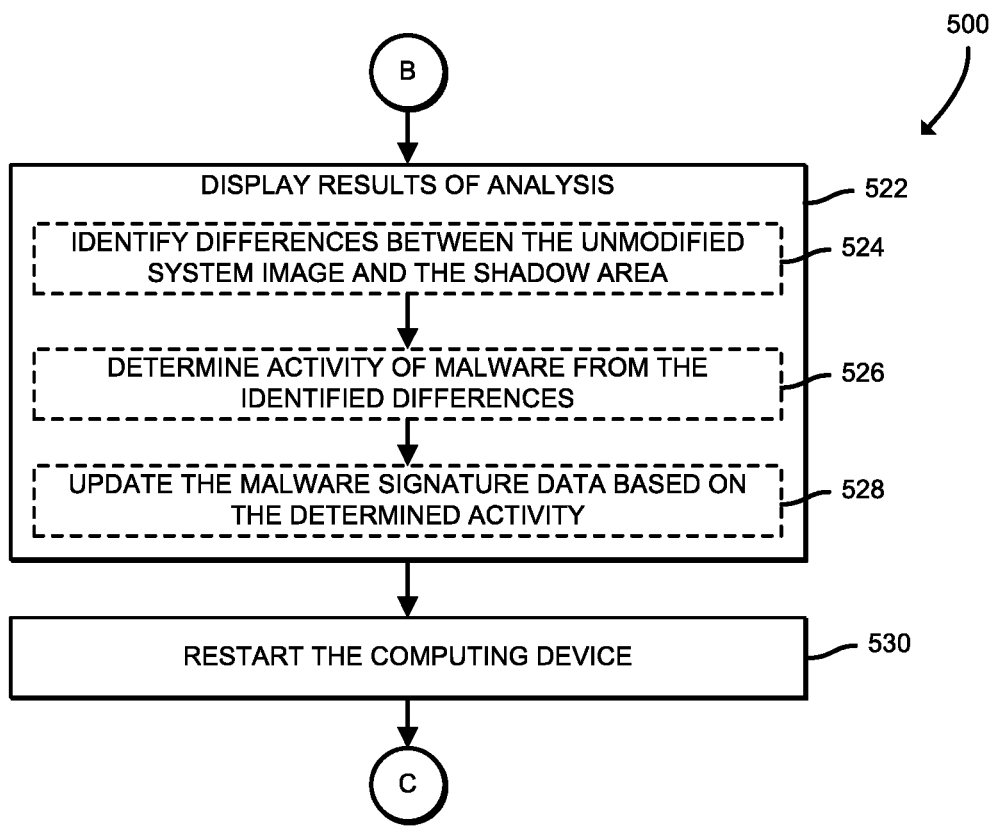

Referring now to FIG. 6, after the computing device 110 has determined that malware was detected, the computing device displays the results of the analysis, as indicated in block 522. In doing so, in the illustrative embodiment, the computing device 110 identifies differences between the unmodified system image (i.e., the unmodified image 206) and the shadow area (i.e., the shadow data 208), as indicated in block 524. This operation may be accelerated by the checkpoint logic 122 of the data storage device 120. Further, in the illustrative embodiment, the computing device 110 determines the activity of the detected malware from the identified differences between the unmodified image 206 and the shadow data 208. The differences may indicate data that was written by the malware before the computing device 110 detected the malware (i.e., earlier instructions that preceded the branch instruction that the computing device 110 determined matched a malware signature), as indicated in block 526. Additionally, as indicated in block 528, the computing device 110 may update the malware signature data (i.e., the malware signatures 204) based on the determined activity from block 526. Accordingly, the computing device 110 may more readily identify the malware in the future. In block 530, the computing device 110 restarts to perform the method 300 described with reference to FIGS. 3-4.

EXAMPLES

Illustrative examples of the technologies disclosed herein are provided below. An embodiment of the technologies may include any one or more, and any combination of, the examples described below.

Example 1 includes a computing device to perform hardware assisted malware detection on an application, the computing device comprising one or more processors with hook logic to monitor for execution of branch instructions of the application, compare the monitored branch instructions to filter criteria, and determine whether a monitored branch instruction satisfies the filter criteria; and a malware detector to provide the filter criteria to the hook logic, provide an address of a callback function to the hook logic to be executed in response to a determination that a monitored branch instruction satisfies the filter criteria, and analyze, in response to execution of the callback function, the monitored branch instruction to determine whether the monitored branch instruction is indicative of malware.

Example 2 includes the subject matter of Example 1, and further including a storage manager to maintain an unmodified system image and redirect data writes to a shadow area that is separate from the unmodified system image.

Example 3 includes the subject matter of any of Examples 1 and 2, and further including a storage manager to atomically (i) perform a system data recovery with an unmodified system image and (ii) enable redirection of data writes to a shadow area that is separate from the unmodified system image.

Example 4 includes the subject matter of any of Examples 1-3, and wherein the storage manager is to perform the system data recovery and enablement of redirection of data writes in a unified extensible firmware interface (UEFI) environment before an operating system of the computing device is booted.

Example 5 includes the subject matter of any of Examples 1-4, and wherein to provide the filter criteria comprises to provide filter criteria to target a call to an application programming interface (API) function.

Example 6 includes the subject matter of any of Examples 1-5, and wherein to analyze the branch instruction comprises to analyze one or more parameters associated with the branch instruction.

Example 7 includes the subject matter of any of Examples 1-6, and wherein to analyze the one or more parameters comprises to read the one or more parameters from a stack.

Example 8 includes the subject matter of any of Examples 1-7, and wherein the malware detector is further to restart, in response to a determination that the monitored branch instruction is indicative of malware, the computing device.

Example 9 includes the subject matter of any of Examples 1-8, and wherein to analyze the branch instruction comprises to compare a context of the monitored branch instruction to malware signature data indicative of actions known to be performed by malware.

Example 10 includes the subject matter of any of Examples 1-9, and further including a storage manager to maintain an unmodified system image in a first area of a data storage device, selectively redirect data writes to a shadow area that is separate from the first area, and determine, in response to a determination that a monitored branch instruction is indicative of malware, differences between the shadow area and the unmodified system image to identify malware behavior.

Example 11 includes the subject matter of any of Examples 1-10, and wherein the malware detector is further to add the identified malware behavior to a set of malware signature data.

Example 12 includes the subject matter of any of Examples 1-11, and further including a storage manager to atomically (i) perform a system data recovery with an unmodified system image stored in a solid state drive and (ii) issue a request to firmware of the solid state drive to enable redirection of data writes to a shadow area that is separate from the unmodified system image.

Example 13 includes the subject matter of any of Examples 1-12, and wherein to provide the filter criteria to the hook logic comprises to issue a request to a library to pass the filter criteria to the hook logic.

Example 14 includes the subject matter of any of Examples 1-13, and wherein the malware detector is further to use the hook logic to set an inline hook to the callback function without recompilation of application code.

Example 15 includes a method for performing hardware assisted malware detection on an application, the method comprising providing, by a computing device, filter criteria to hook logic of the computing device; providing, by the computing device, an address of a callback function to the hook logic to be executed in response to a determination that a monitored branch instruction of the application satisfies the filter criteria; monitoring, by the hook logic of the computing device, execution of branch instructions of the application; comparing, by the hook logic of the computing device, the monitored branch instructions to the filter criteria; determining, by the hook logic of the computing device, whether one of the monitored branch instructions satisfies the filter criteria; and executing, by the computing device, the callback function in response to a determination that one of the monitored branch instructions satisfies the filter criteria, to analyze the monitored branch instruction to determine whether the monitored branch instruction is indicative of malware.

Example 16 includes the subject matter of Example 15, and further including maintaining, by the computing device, an unmodified system image; and redirecting, by the computing device, data writes to a shadow area that is separate from the unmodified system image.

Example 17 includes the subject matter of any of Examples 15 and 16, and further including atomically performing a system data recovery with an unmodified system image and enabling redirection of data writes to a shadow area that is separate from the unmodified system image.

Example 18 includes the subject matter of any of Examples 15-17, and wherein performing the system data recovery and enabling redirection of data writes comprises performing the system data recovery and enabling redirection of data writes in a unified extensible firmware interface (UEFI) environment before an operating system of the computing device is booted.

Example 19 includes the subject matter of any of Examples 15-18, and wherein providing the filter criteria comprises providing filter criteria to target a call to an application programming interface (API) function.

Example 20 includes the subject matter of any of Examples 15-19, and wherein analyzing the branch instruction comprises analyzing one or more parameters associated with the branch instruction.

Example 21 includes the subject matter of any of Examples 15-20, and wherein analyzing the one or more parameters comprises reading the one or more parameters from a stack.

Example 22 includes the subject matter of any of Examples 15-21, and further including restarting, in response to a determination that the monitored branch instruction is indicative of malware, the computing device.

Example 23 includes the subject matter of any of Examples 15-22, and wherein analyzing the branch instruction comprises comparing a context of the monitored branch instruction to malware signature data indicative of actions known to be performed by malware.

Example 24 includes the subject matter of any of Examples 15-23, and further including maintaining, by the computing device, an unmodified system image in a first area of a data storage device; selectively redirecting, by the computing device, data writes to a shadow area that is separate from the first area; and determining, by the computing device and in response to a determination that a monitored branch instruction is indicative of malware, differences between the shadow area and the unmodified system image to identify malware behavior.

Example 25 includes the subject matter of any of Examples 15-24, and further including adding the identified malware behavior to a set of malware signature data.

Example 26 includes the subject matter of any of Examples 15-25, and further including atomically performing a system data recovery with an unmodified system image stored in a solid state drive and issuing a request to firmware of the solid state drive to enable redirection of data writes to a shadow area that is separate from the unmodified system image.

Example 27 includes the subject matter of any of Examples 15-26, and wherein providing the filter criteria to the hook logic comprises issuing a request to a library to pass the filter criteria to the hook logic.

Example 28 includes the subject matter of any of Examples 15-27, and further including using the hook logic to set an inline hook to the callback function without recompilation of application code.

Example 29 includes one or more machine-readable storage media comprising a plurality of instructions stored thereon that in response to being executed, cause a computing device to perform the method of any of Examples 15-28.

Example 30 includes a computing device comprising means for providing filter criteria to hook logic of the computing device; means for providing an address of a callback function to the hook logic to be executed in response to a determination that a monitored branch instruction of the application satisfies the filter criteria; means for monitoring, with the hook logic, execution of branch instructions of the application; means for comparing, with the hook logic, the monitored branch instructions to the filter criteria; means for determining, with the hook logic, whether one of the monitored branch instructions satisfies the filter criteria; and means for executing the callback function in response to a determination that one of the monitored branch instructions satisfies the filter criteria, to analyze the monitored branch instruction to determine whether the monitored branch instruction is indicative of malware.

Example 31 includes the subject matter of Example 30, and further including means for maintaining an unmodified system image; and means for redirecting data writes to a shadow area that is separate from the unmodified system image.

Example 32 includes the subject matter of any of Examples 30 and 31, and further including means for atomically performing a system data recovery with an unmodified system image and enabling redirection of data writes to a shadow area that is separate from the unmodified system image.

Example 33 includes the subject matter of any of Examples 30-32, and wherein the means for performing the system data recovery and enabling redirection of data writes comprises means for performing the system data recovery and enabling redirection of data writes in a unified extensible firmware interface (UEFI) environment before an operating system of the computing device is booted.

Example 34 includes the subject matter of any of Examples 30-33, and wherein the means for providing the filter criteria comprises means for providing filter criteria to target a call to an application programming interface (API) function.

Example 35 includes the subject matter of any of Examples 30-34, and wherein the means for analyzing the branch instruction comprises means for analyzing one or more parameters associated with the branch instruction.

Example 36 includes the subject matter of any of Examples 30-35, and wherein the means for analyzing the one or more parameters comprises means for reading the one or more parameters from a stack.

Example 37 includes the subject matter of any of Examples 30-36, and further including means for restarting, in response to a determination that the monitored branch instruction is indicative of malware, the computing device.

Example 38 includes the subject matter of any of Examples 30-37, and wherein the means for analyzing the branch instruction comprises means for comparing a context of the monitored branch instruction to malware signature data indicative of actions known to be performed by malware.

Example 39 includes the subject matter of any of Examples 30-38, and further including means for maintaining an unmodified system image in a first area of a data storage device; means for selectively redirecting data writes to a shadow area that is separate from the first area; and means for determining, in response to a determination that a monitored branch instruction is indicative of malware, differences between the shadow area and the unmodified system image to identify malware behavior.

Example 40 includes the subject matter of any of Examples 30-39, and further including means for adding the identified malware behavior to a set of malware signature data.

Example 41 includes the subject matter of any of Examples 30-40, and further including means for atomically performing a system data recovery with an unmodified system image stored in a solid state drive and issuing a request to firmware of the solid state drive to enable redirection of data writes to a shadow area that is separate from the unmodified system image.

Example 42 includes the subject matter of any of Examples 30-41, and wherein the means for providing the filter criteria to the hook logic comprises means for issuing a request to a library to pass the filter criteria to the hook logic.

Example 43 includes the subject matter of any of Examples 30-42, and further including means for using the hook logic to set an inline hook to the callback function without recompilation of application code.

The invention claimed is:

1. A computing device to perform hardware assisted malware detection on an application, the computing device comprising:
   one or more processors with hook logic to monitor for execution of branch instructions of the application, compare the monitored branch instructions to filter criteria, and determine whether a monitored branch instruction satisfies the filter criteria;
   a malware detector to provide the filter criteria to the hook logic, provide an address of a callback function to the hook logic to be executed in response to a determination that a monitored branch instruction satisfies the filter criteria, and analyze, in response to execution of the callback function, the monitored branch instruction to determine whether the monitored branch instruction is indicative of malware; and
   a storage manager to determine, in response to a determination that the monitored branch instruction is indicative of malware, differences between an unmodified system image and a shadow area that was written to by the application, and write, to malware signature data usable by the malware detector to determine whether activity of the application is indicative of malware, data indicative of the determined differences between the unmodified system image and the shadow area.

2. The computing device of claim 1, wherein the storage manager redirect data writes to the shadow area that is separate from the unmodified system image.

3. The computing device of claim 1, wherein the storage manager to atomically (i) perform a system data recovery with the unmodified system image and (ii) enable redirection of data writes to the shadow area that is separate from the unmodified system image.

4. The computing device of claim 3, wherein the storage manager is to perform the system data recovery and enablement of redirection of data writes in a unified extensible firmware interface (UEFI) environment before an operating system of the computing device is booted.

5. The computing device of claim 1, wherein to provide the filter criteria comprises to provide filter criteria to target a call to an application programming interface (API) function.

6. The computing device of claim 1, wherein to analyze the branch instruction comprises to analyze one or more parameters associated with the branch instruction.

7. The computing device of claim 6, wherein to analyze the one or more parameters comprises to read the one or more parameters from a stack.

8. The computing device of claim 1, wherein the malware detector is further to restart, in response to a determination that the monitored branch instruction is indicative of malware, the computing device.

9. The computing device of claim 1, wherein to analyze the branch instruction comprises to compare a context of the monitored branch instruction to the malware signature data indicative of actions known to be performed by malware.

10. One or more non-transitory machine-readable storage media comprising a plurality of instructions stored thereon that in response to being executed, cause a computing device to:
provide filter criteria to hook logic of the computing device;
provide an address of a callback function to the hook logic to be executed in response to a determination that a monitored branch instruction of an application satisfies the filter criteria;
monitor, with the hook logic, execution of branch instructions of the application;
compare, with the hook logic, the monitored branch instructions to the filter criteria;
determine, with the hook logic, whether one of the monitored branch instructions satisfies the filter criteria;
execute the callback function in response to a determination that one of the monitored branch instructions satisfies the filter criteria, to analyze the monitored branch instruction to determine whether the monitored branch instruction is indicative of malware;
determine, in response to a determination that the monitored branch instruction is indicative of malware, differences between an unmodified system image and a shadow area that was written to by the application; and
write, to malware signature data usable by the computing device to determine whether activity of the application is indicative of malware, data indicative of the determined differences between the unmodified system image and the shadow area.

11. The one or more non-transitory machine-readable storage media of claim 10, wherein the plurality of instructions further cause the computing device to:
redirect data writes to the shadow area that is separate from the unmodified system image.

12. The one or more non-transitory machine-readable storage media of claim 10, wherein the plurality of instructions further cause the computing device to atomically perform a system data recovery with the unmodified system image and enable redirection of data writes to the shadow area that is separate from the unmodified system image.

13. The one or more non-transitory machine-readable storage media of claim 12, wherein to perform the system data recovery and enable redirection of data writes comprises to perform the system data recovery and enable redirection of data writes in a unified extensible firmware interface (UEFI) environment before an operating system of the computing device is booted.

14. The one or more non-transitory machine-readable storage media of claim 10, wherein to provide the filter criteria comprises to provide filter criteria to target a call to an application programming interface (API) function.

15. The one or more non-transitory machine-readable storage media of claim 10, wherein to analyze the branch instruction comprises to analyze one or more parameters associated with the branch instruction.

16. The one or more non-transitory machine-readable storage media of claim 15, wherein to analyze the one or more parameters comprises to read the one or more parameters from a stack.

17. The one or more non-transitory machine-readable storage media of claim 10, wherein the plurality of instructions further cause the computing device to restart, in response to a determination that the monitored branch instruction is indicative of malware, the computing device.

18. The one or more non-transitory machine-readable storage media of claim 10, wherein to analyze the branch instruction comprises to compare a context of the monitored branch instruction to the malware signature data indicative of actions known to be performed by malware.

19. A method for performing hardware assisted malware detection on an application, the method comprising:
providing, by a computing device, filter criteria to hook logic of the computing device;
providing, by the computing device, an address of a callback function to the hook logic to be executed in response to a determination that a monitored branch instruction of the application satisfies the filter criteria;
monitoring, by the hook logic of the computing device, execution of branch instructions of the application;
comparing, by the hook logic of the computing device, the monitored branch instructions to the filter criteria;
determining, by the hook logic of the computing device, whether one of the monitored branch instructions satisfies the filter criteria;
executing, by the computing device, the callback function in response to a determination that one of the monitored branch instructions satisfies the filter criteria, to analyze the monitored branch instruction to determine whether the monitored branch instruction is indicative of malware;
determining, by the computing device and in response to a determination that the monitored branch instruction is indicative of malware, differences between an unmodified system image and a shadow area that was written to by the application; and
writing, by the computing device and to malware signature data usable by the computing device to determine whether activity of the application is indicative of malware, data indicative of the determined differences between the unmodified system image and the shadow area.

20. The method of claim 19, further comprising: redirecting, by the computing device, data writes to the shadow area that is separate from the unmodified system image.

21. The method of claim 19, further comprising atomically performing a system data recovery with the unmodified system image and enabling redirection of data writes to the shadow area that is separate from the unmodified system image.

22. The method of claim 21, wherein performing the system data recovery and enabling redirection of data writes comprises performing the system data recovery and enabling redirection of data writes in a unified extensible firmware interface (UEFI) environment before an operating system of the computing device is booted.

23. The method of claim 19, wherein providing the filter criteria comprises providing filter criteria to target a call to an application programming interface (API) function.

* * * * *